United States Patent [19]

Kawanishi et al.

[11] Patent Number: 5,588,002
[45] Date of Patent: Dec. 24, 1996

[54] MULTIPLEX TRANSMISSION APPARATUS FOR SUPPORTING PRIORITIZED COMMUNICATIONS AMONG A PLURALITY OF NETWORK NODES

[75] Inventors: Toshiaki Kawanishi; Yoshikazu Nobutoki; Seiji Hirano; Koji Terayama, all of Hiroshima, Japan

[73] Assignee: Mazda Motor Corporation, Hiroshima, Japan

[21] Appl. No.: 408,190

[22] Filed: Mar. 22, 1995

Related U.S. Application Data

[63] Continuation of Ser. No. 100,965, Aug. 3, 1993, abandoned.

[30] Foreign Application Priority Data

Aug. 6, 1992 [JP] Japan ..................................... 4-210245

[51] Int. Cl.[6] .................................................. H04L 12/46
[52] U.S. Cl. ............................................ 370/462; 370/468
[58] Field of Search .................................. 370/85.1, 85.6, 370/85.9, 85.13, 85.14, 94.1, 84, 13, 16, 17; 340/825.5, 825.51, 825.52

[56] References Cited

U.S. PATENT DOCUMENTS

| | | | |
|---|---|---|---|
| 4,607,256 | 8/1986 | Henzel | 370/85.4 |
| 4,627,052 | 12/1986 | Hoare et al. | 370/85.13 |
| 4,706,080 | 11/1987 | Sincoskie | 370/85.13 |
| 5,016,244 | 5/1991 | Massey et al. | 370/16 |
| 5,027,350 | 6/1991 | Marshall | 370/85.13 |
| 5,046,065 | 9/1991 | Göertz | 370/85.13 |
| 5,079,764 | 1/1992 | Orita et al. | 370/85.13 |
| 5,218,600 | 6/1993 | Schenkyr et al. | 370/16 |
| 5,379,292 | 1/1995 | Kurata et al. | 370/85.14 |

FOREIGN PATENT DOCUMENTS

4-95545  3/1992  Japan .

Primary Examiner—Douglas W. Olms
Assistant Examiner—Chau T. Nguyen

[57] ABSTRACT

A plurality of gateway nodes for connecting high- and low-speed networks as multiplex transmission lines include buffers for signal transmission and reception, communication ICs, and control units. A priority order in signal processing is set for these gateway nodes. Only a gateway node which operates normally and has the highest priority executes signal transmission between the high- and low-speed networks.

7 Claims, 9 Drawing Sheets

MULTIPLEX TRANSMISSION APPARATUS FOR SUPPORTING PRIORITIZED COMMUNICATIONS AMONG A PLURALITY OF NETWORK NODES

This application is a continuation of application Ser. No. 08/100,965, filed Aug. 3, 1993, now abandoned.

BACKGROUND OF THE INVENTION

1. Field of the Invention

The present invention relates to a multiplex transmission apparatus with multiplex transmission lines capable of transmitting a variety of types of signals.

2. Description of the Related Art

Recently vehicles have realized an increasing number of on-board electronic devices. These devices are mounted in such vehicles due to advances in electronic control systems. Consequently, the number of wire harnesses used in vehicles has increased significantly. To decrease the number of wire harnesses used, a multiplex transmission system which transmits a variety of types of signals through a single wire harness has been widely adopted.

In the past, the present applicant has proposed a multiplex transmission apparatus including at least two wire harnesses (Japanese Patent Application Laid-open No. 4-95545). In the multiplex transmission apparatus described in the JP-'545 Publication one of two wire harnesses is used as a high-speed multiplex communication line to exchange signals of more importance in controlling the running conditions of a vehicle, such as signals for ABS systems (anti-lock brake system), EGI system (fuel injection control), TRC system (traction control), 4WS (4-wheel steering), and ACS system (active suspension). The other wire harness, on the other hand, is used as a low-speed multiplex communication line to exchange signals that need not operate instantaneously, such as signals for lamps, an air-conditioner, wipers, an audio system, power windows, and signals for meters, such as a water temperature meter and a speedometer.

The high-speed and low-speed multiplex communication lines are connected via gateway nodes, and the signals are exchanged between the two communication lines through these gateway nodes. In such case, a plurality of gateway nodes are connected between the two lines so that even if one gateway node malfunctions, the signals can be exchanged between the two communication lines through another gateway node.

In the above conventional multiplex transmission apparatus, however, since the high-speed and low-speed multiplex communication lines are connected via a plurality of gateway nodes, identical signals may be repeatedly transmitted from one communication line to the other. This brings about a problem of a low transmission efficiency of signals when, for example, the quantity of signals to be transmitted is large.

In addition, if identical signals are repeatedly transmitted in a multiplex transmission apparatus in which the transmission of signals through gateway nodes is performed by using ON/OFF switches, a switch to be turned on may be turned off or vice versa, impairing the reliability of the apparatus.

SUMMARY OF THE INVENTION

It is an object of the present invention to provide a multiplex transmission apparatus which improves the reliability of the apparatus by preventing a repetitive transmission of identical signals from one multiplex transmission line to the other.

In order to achieve the above object of the present invention, there is provided a multiplex transmission apparatus having a plurality of control units connected independently of one another between a plurality of multiplex transmission lines, the plurality of control units performing transmission and reception of signals between the plurality of multiplex transmission lines in accordance with internal control programs of the control units, comprising setting means for setting a priority order in processing for the plurality of control units, informing means for sending information indicating that a first control unit with a higher priority of the plurality of control units has performed a predetermined signal reception, and determining means for determining whether a second control unit with a lower priority has received the information. The apparatus functions so that if the second control unit has received the information, the first control unit is allowed to perform predetermined signal transmitting processing while the second control unit is inhibited to perform predetermined signal transmitting processing, and, if the second control unit has not received the information, the second control unit is allowed to perform predetermined signal transmitting processing.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A first embodiment of the present invention will be described below with reference to FIGS. 1 to 4. In this embodiment, a multiplex transmission apparatus includes two multiplex transmission lines and two control units.

Figure 1:
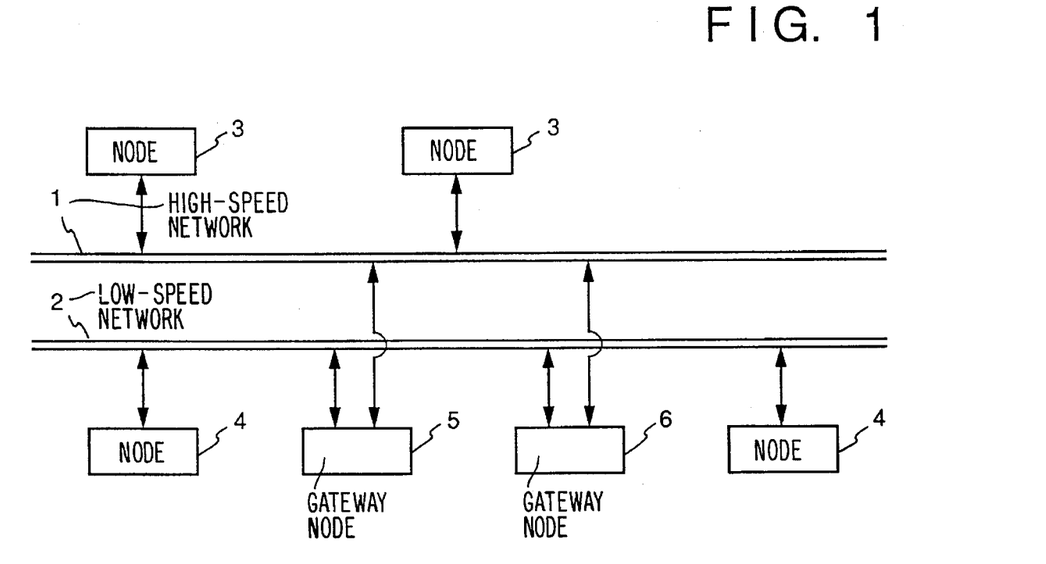
FIG. 1 is a block diagram showing the arrangement of a multiplex transmission apparatus according to a first embodiment of the present invention.

As shown in FIG. 1, the multiplex transmission apparatus of this embodiment includes a high-speed network 1 and a low-speed network 2 each constituted by a closed-loop bus, and gateway nodes 5 and 6 as control units for controlling the traveling state of a vehicle are connected between the networks 1 and 2.

A plurality of nodes 3 of more importance for reliability and safety in controlling the traveling state of a vehicle are connected independently of one another to the high-speed network 1. These nodes 3 are, for example, a flow control valve and an oil passage shut-off valve provided in hydraulic piping to a suspension damper, a solenoid of a brake hydraulic control valve, a solenoid of a hydraulic control valve for steering rear wheels, actuators such as an injection driver for fuel injection, and various sensors.

A plurality of nodes 4 of less importance for reliability and safety in controlling the traveling state of a vehicle are connected independently of one another to the low-speed network 2. These nodes 4 are, for example, various warning lamps and lamps as constituting elements of meters, actuators, e.g., several different switches such as a rear-defogger switch, and various sensors. The gateway nodes 5 and 6 described above operate as, e.g., an ACS system (active suspension) control unit, a 4WS system (4-wheel steering) control unit, an ABS/TRC system (anti-lock brake system/traction) control unit, and an EGI system (fuel injection control) unit.

Figure 2:
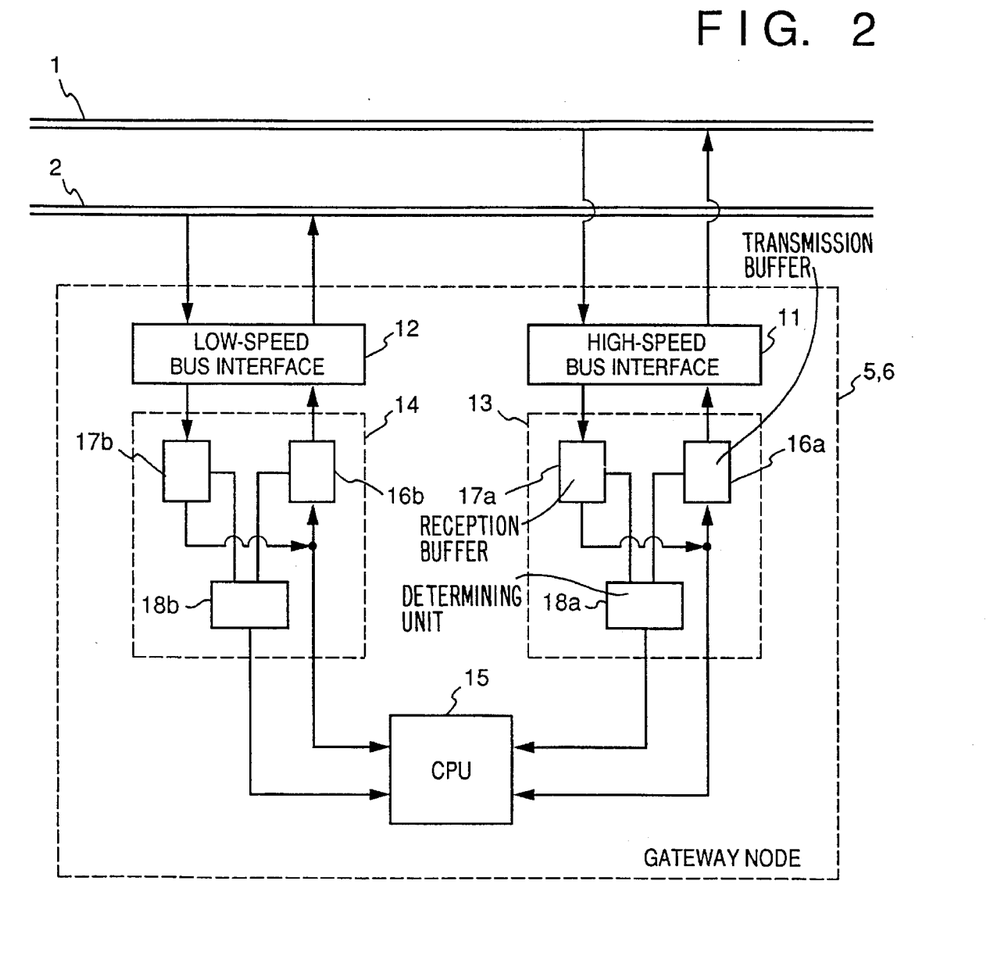
FIG. 2 is a block diagram showing the arrangement of a gateway node of the multiplex transmission apparatus according to the embodiment depicted in FIG. 1.

As shown in FIG. 2, the gateway node 5 is constituted by a high-speed bus interface 11 connected to the high-speed network 1, a low-speed bus interface 12 connected to the low-speed network 2, a high-speed communication LSI 13, a low-speed communication LSI 14, and a CPU 15 which functions as regulating means and control means.

The high-speed communication LSI 13 has a transmission buffer 16a, a reception buffer 17a, and a determining unit 18a consisting of an LSI and the like. The high-speed communication LSI 13 transfers input signals from the high-speed bus interface 11 to the CPU 15 via the reception buffer 17a and also transfers input signals from the CPU 15 to the high-speed bus interface 11 via the transmission buffer 16a. The determining unit 18a informs the CPU 15 of transmission of signals to the high-speed network 1 or reception of signals from the high-speed network 1.

Likewise, the low-speed communication LSI 14 has a transmission buffer 16b, a reception buffer 17b, and a determining unit 18b consisting of an LSI and the like. The low-speed communication LSI 14 transfers input signals from the low-speed bus interface 12 to the CPU 15 via the reception buffer 17b and also transfers input signals from the CPU 15 to the low-speed bus interface 12 via the transmission buffer 16b. The determining unit 18b informs the CPU 15 of transmission of signals to the low-speed network 2 or reception of signals from the low-speed network 2.

The CPU 15 includes a ROM (not shown) which stores programs for executing the ACS control, the 4WS control, the ABS/TRC control, and the EGI control described above, and programs for executing receiving processing to be described later. The CPU 15 controls signals in accordance with these programs.

The gateway node 6 has the same arrangement as that of the gateway node 5. The two gateway nodes 5 and 6 are connected independently of each other between high-speed and low-speed networks 1 and 2.

The CPU 15 of the gateway node 6 receives a reception acknowledgement signal (ACK signal) transmitted from the CPU 15 of the gateway node 5 to the high-speed or the low-speed network 1 or 2 when the gateway node 5 controls a received signal. In this manner, a priority order in processing is set for the gateway nodes 5 and 6. That is, the gateway node 5 has a relatively higher priority to the gateway node 6.

In order to give priority to the gateway node 6 over the gateway node 5, the CPU 15 of the gateway node 5 need only receive a reception acknowledgement signal (ACK signal) transmitted from the CPU 15 of the gateway node 6 to the high-speed or low-speed network 1 or 2.

The receiving processing performed by the CPUs 15 of the gateway nodes 5 and 6 with the above arrangement will be described below with reference to flow charts shown in FIGS. 3A, 3B, and 4. Assume in the following description that the gateway node 5 has priority to the gateway node 6 in gateway processing.

Figure 3A:
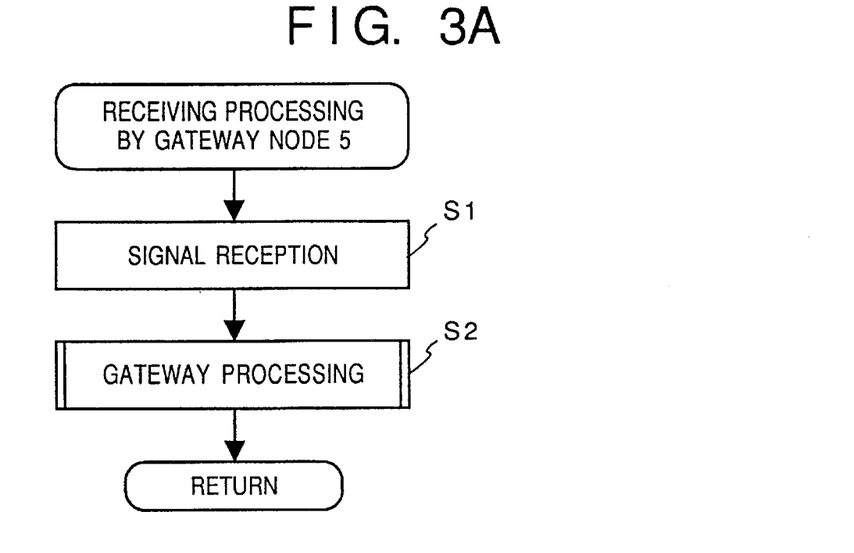
FIGS. 3A and 3B are flow charts which illustrates receiving processing performed by the gateway nodes according to the embodiment depicted in FIG. 1.

As shown in FIG. 3A, when the reception buffer 17a or 17b of the gateway node 5 receives a signal from the high-speed or low-speed network 1 or 2, the CPU 15 detects the reception of that signal from information from the determining unit 18a or 18b (step S1). The CPU 15 then performs gateway processing to be described later (step S2) and returns the flow. When the processing in step S2 is executed, the CPU 15 of the gateway node 5 transmits a reception acknowledgement signal to the CPU 15 of the gateway node 6 through the high-speed or the low-speed network 1 or 2. The operation is so performed because the gateway node 5 has priority in processing over the gateway node 6.

Figure 3B:
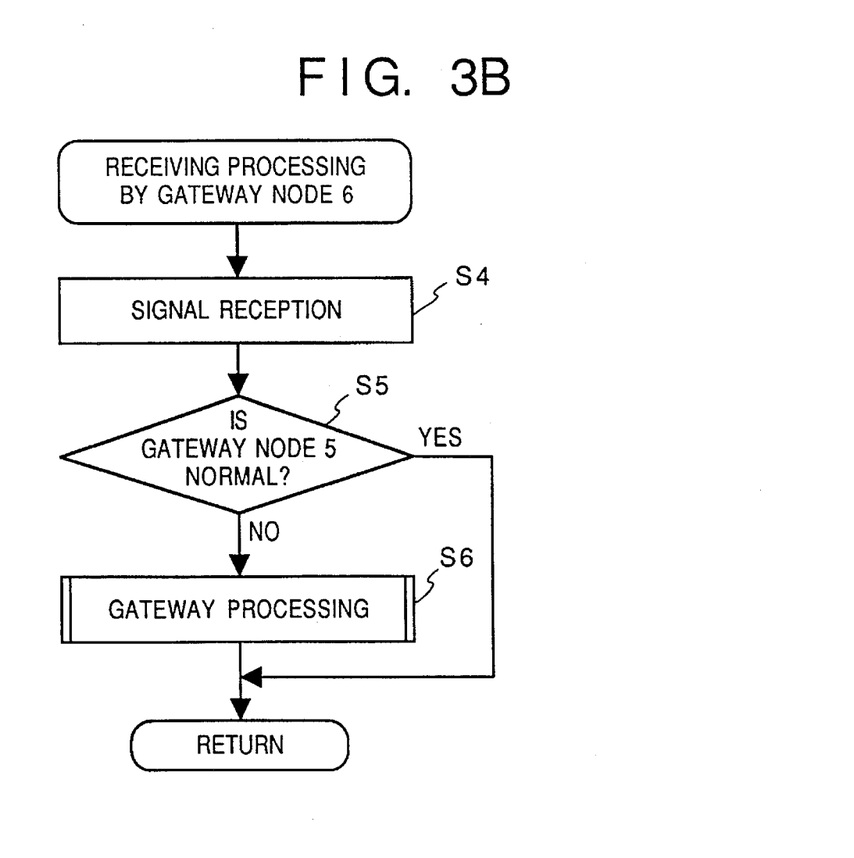

As shown in FIG. 3B, on the other hand, when the reception buffer 17a or 17b of the gateway node 6 receives a signal from the high-speed or from the low-speed network 1 or 2, the CPU 15 of the gateway node 6 detects the reception of that signal by information from the determining unit 18a or 18b (step S4). The CPU 15 then checks whether a reception acknowledgement signal from the gateway node 5 has been received (i.e., whether the gateway node 5 operates normally) (step S5).

When the reception acknowledgement signal from the gateway node 5 is received, the CPU 15 of the gateway node 6 determines that the gateway node 5 operates normally, and therefore returns the flow without performing gateway processing for that signal. If, on the other hand, it is determined in step S5 that no reception acknowledgement signal from the gateway node 5 has been received, the CPU 15 of the gateway node 6 determines that some abnormality has occurred in the gateway node 5 to prevent the gateway node 5 from operating normally. Therefore, the CPU 15 of the gateway node 6 performs gateway processing to be described later (step S6) and returns the flow. The gateway node 6, therefore, performs gateway processing for signals only when some abnormality occurs in the gateway node 5.

Figure 4:
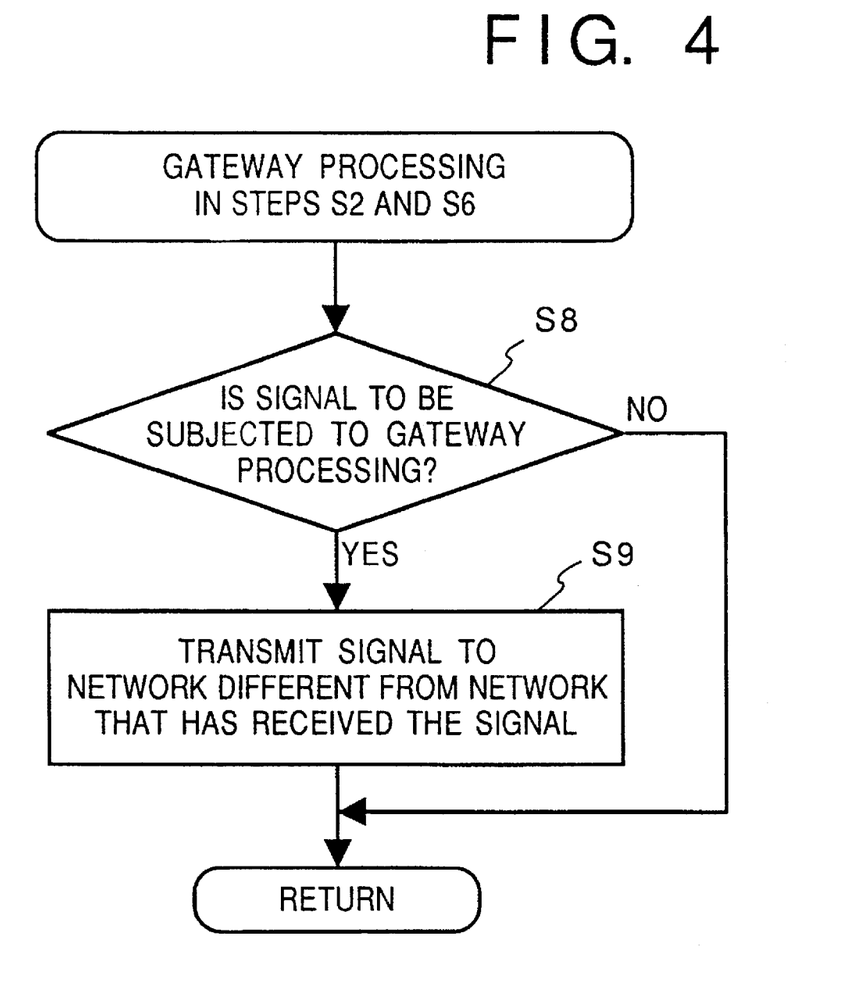
FIG. 4 is a flow chart for explaining the gateway processing performed by the gateway nodes according to the embodiment depicted in FIG. 1.

The gateway processing executed in steps S2 and S6 described above is performed on the basis of a flow chart shown in FIG. 4. First, the CPU 15 reads out an ID code from the frame of a signal received by the reception buffer 17a or 17b and checks to determine which factor of traveling of a vehicle the received signal relates. For example, the CPU 15 checks in accordance with the importance of that signal with respect to the reliability and the safety of a vehicle whether the signal is to be subjected to the gateway processing (step S8). If the CPU 15 determines in step S8 that the received signal is to be subjected to the gateway processing from the high-speed network 1 to the low-speed network 2 or vice versa, the CPU 15 transmits the signal from the network, in which the CPU 15 has received that signal, to the other (step S9) and returns the flow. If the CPU 15 determines in step S8 that the received signal is not to be subjected to the gateway processing, the CPU 15 returns the flow without transmitting the signal from one network to the other.

In the multiplex transmission apparatus of this embodiment, as described above, the priority order is set for the gateway nodes 5 and 6. When the CPUs 15 of the gateway nodes 5 and 6 determine that the gateway node 5 having a higher priority operates normally, the gateway processing for signals is performed only in the gateway node 5; that is, the gateway processing for signals is performed in the gateway node 6 only when the gateway 5 does not operate normally. This arrangement prevents the two gateway nodes 5 and 6 from repeatedly transmitting identical signals from the high-speed network 1 to the low-speed network 2 or vice versa, thereby making it possible to increase the reliability of the multiplex transmission apparatus.

Although the gateway node 5 has priority to the gateway node 6 in the above-described embodiment, it is, of course, possible to obtain the same effect when the gateway node 6 has given priority over the gateway node 5.

A second embodiment of the present invention will be described below with reference to flow charts illustrated in FIGS. 5A and 5B. In this embodiment, a multiplex transmission apparatus includes two multiplex transmission lines and two control units. For the sake of convenience in explanation, the same reference numerals as in the drawings related to the first embodiment described above denote parts having the same functions and a detailed description thereof will be omitted.

In the multiplex transmission apparatus of this embodiment, unlike the first embodiment, CPUs 15 of gateway nodes 5 and 6 shown in FIG. 2 do not function as control means. That is, control is not performed such that only a gateway node which operates normally and has the highest priority so as to transmit signals between high-speed and low-speed networks 1 and 2. Instead, each CPU 15 functions as detecting means and inhibiting means; that is, each CPU 15 detects signals transmitted in the high-speed or low-speed network 1 or 2, and, if a signal identical with a signal which the gateway node 5 or 6 intends to transmit is detected in the network on the reception side, inhibits the transmission of that signal. Determining units 18a and 18b constitute the detecting means together with the CPU 15. The other arrangement is the same as that of the multiplex transmission apparatus according to the first embodiment described above.

The receiving processing performed by CPU 15 and the determining units 18a and 18b of each of the gateway nodes 5 and 6 will be described below by taking the gateway node 5 as an example.

Figure 5A:
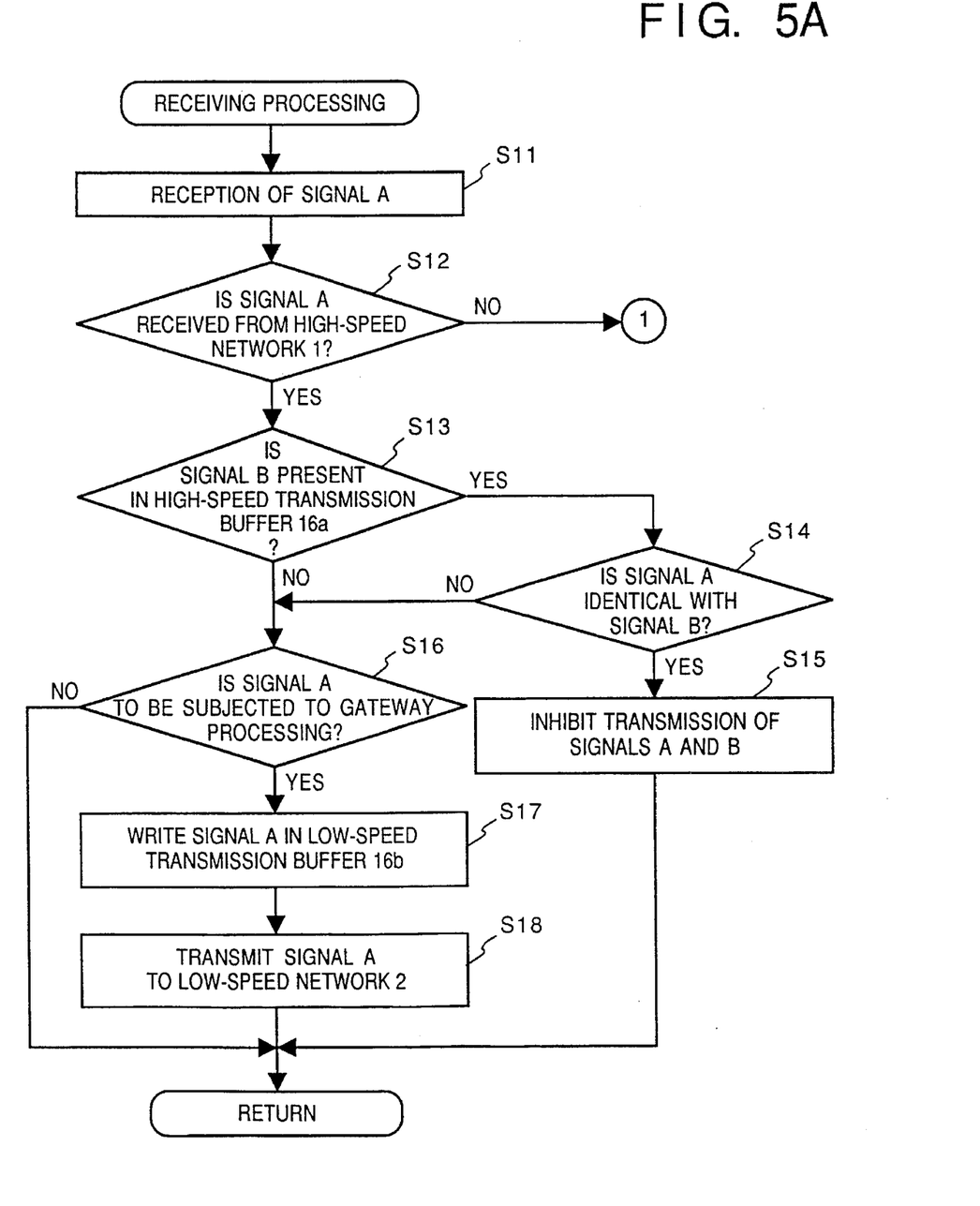
FIGS. 5A and 5B are flow charts which illustrate the receiving processing performed by gateway nodes of a multiplex transmission apparatus according to a second embodiment of the present invention.
Figure 5B:
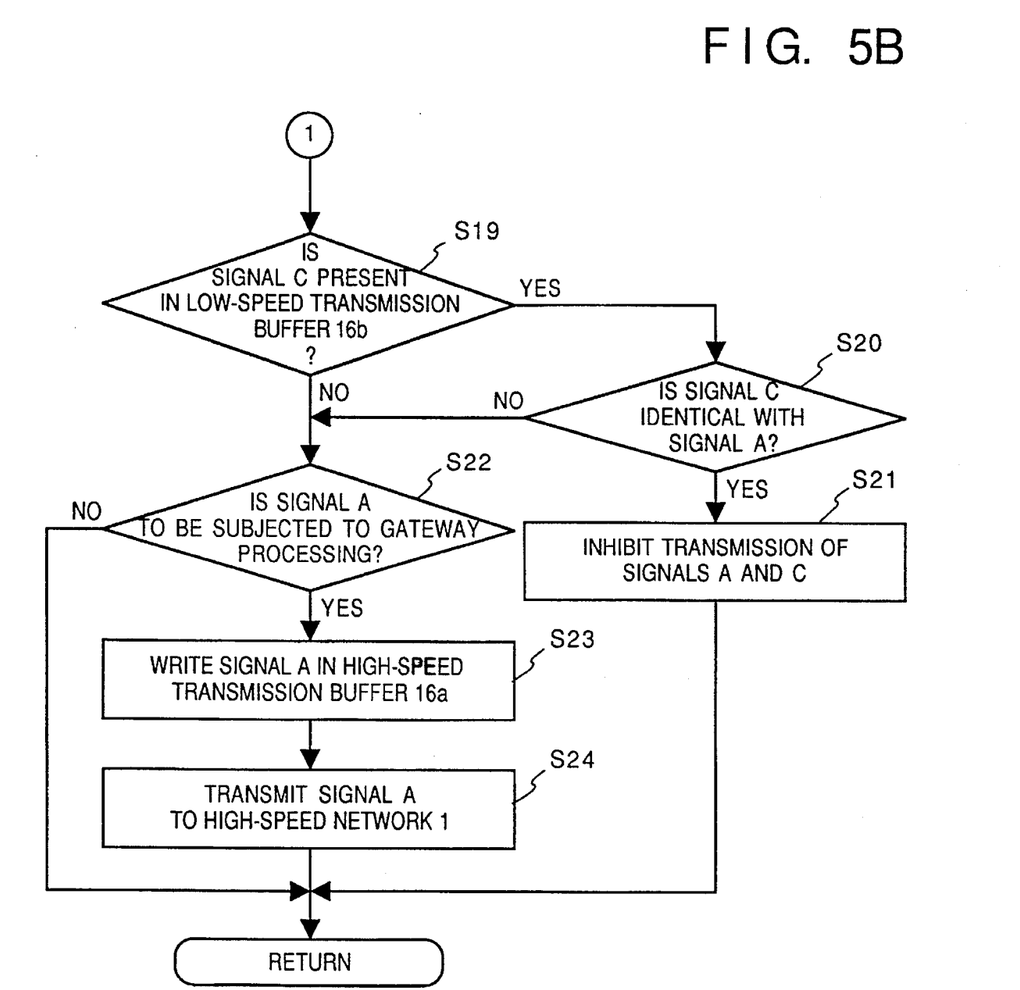

As shown in FIG. 5A, when a reception buffer 17a or 17b of the gateway node 5 receives a signal A from the high-speed or from the low-speed network 1 or 2, the CPU 15 as the detecting means detects the reception of the signal A by information from the determining unit 18a or 18b (step S11) and checks whether the signal A is received from the high-speed network 1 (step S12). If the CPU 15 determines that the signal A is received from the high-speed network 1, the CPU 15 then checks whether a signal B which is received from the low-speed network 2 which has already been subjected to gateway processing is present in a transmission buffer 16a of a high-speed communication LSI 13 (step S13).

If the signal B is present in the transmission buffer 16a of the high-speed communication LSI 13, the CPU 15 checks whether the signal B is identical with the received signal A (step S14). If the signal B is identical with the signal A, this means that a signal identical with a signal which the gateway node 5 intends to transmit is present in the network on the reception side. Therefore, the CPU 15 as the inhibiting means inhibits the transmission of the signals A and B (step S15) and returns the flow.

If the CPU 15 determines in step S13 that no signal B is present in the transmission buffer 16a of the high-speed communication LSI 13 or determines in step S14 that the signal B is not identical with the signal A, the CPU 15 reads out an ID code from the frame of the signal A, checking to which factor of traveling of a vehicle the signal A relates. For example, the CPU 15 determines in accordance with the importance of the signal A with respect to the reliability and the safety of a vehicle whether the signal A is to be subjected to gateway processing (step S16). If the CPU 15 determines that the signal A is to be subjected to gateway processing from the high-speed network 1 to the low-speed network 2, the CPU 15 writes the signal A in a transmission buffer 16b of a low-speed communication LSI 14 (step S17), causing the low-speed communication LSI 14 to transmit the signal A to the low-speed network 2 (step S18), and returning the flow. The signal B present in the transmission buffer 16a of the high-speed communication LSI 13 is transmitted to the high-speed network 1.

If, on the other hand, the CPU 15 determines in step S16 that the signal A is not to be subjected to the gateway processing from the high-speed network 1 to the low-speed network 2, the CPU 15 returns the flow without transmitting the signal A to the low-speed network 2.

If the CPU 15 determines in step S12 that the signal A is not received from the high-speed network 1, i.e., that the signal A is received from the low-speed network 2, the CPU 15 checks whether a signal C which is received from the high-speed network 1 and already subjected to the gateway processing is present in the transmission buffer 16b of the low-speed communication LSI 14 (step S19).

If the signal C is present in the transmission buffer 16b of the low-speed communication LSI 14, the CPU 15 checks whether the signal C is identical with the received signal A (step S20). If the signal C is identical with the signal A, such a condition means that a signal identical with a signal which the gateway node 5 intends to transmit is present in the network on the reception side. Therefore, the CPU 15 as the inhibiting means inhibits the transmission of the signals A and C (step S21) and returns the flow.

If the CPU 15 determines in step S19 that no signal C is present in the transmission buffer 16b of the low-speed communication LSI 14 or determines in step S20 that the signal C is not identical with the signal A, the CPU 15 reads out an ID code from the frame of the signal A, checking to which factor of traveling of a vehicle the signal A relates. For example, in the same way as described above, the CPU checks in accordance with the importance of the signal A with respect to the reliability and the safety of a vehicle whether the signal A is to be subjected to gateway processing (step S22). If the CPU 15 determines that the signal A is to be subjected to gateway processing from the low-speed network 2 to the high-speed network 1, the CPU 15 writes the signal A in the transmission buffer 16a of the high-speed communication LSI 13 (step S23), causing the high-speed communication LSI 13 to transmit the signal A to the high-speed network 1 (step S24), and returning the flow. The signal C present in the transmission buffer 16b of the low-speed communication LSI 14 is transmitted to the low-speed network 2.

If, on the other hand, the CPU 15 determines in step S22 that the signal A is not to be subjected to the gateway processing from the low-speed network 2 to the high-speed network 1, the CPU 15 returns the flow without transmitting the signal A to the high-speed network 1.

As described above, in the multiplex transmission apparatus of this embodiment, the CPU 15 and the determining units 18a and 18b of the gateway node 5 detect signals transmitted in the high-speed and low-speed networks 1 and 2, and, if a signal identical with a signal which the gateway node 5 intends to transmit is detected in the network on the reception side, inhibits the transmission of that signal. This prevents a repetitive transmission of identical signals from the low-speed network 2 to the high-speed network 1, and the reliability of the multiplex transmission apparatus can be increased.

Although the above embodiment has been described by taking the gateway node 5 as an example, the same receiving processing may also be performed by the gateway node 6.

A third embodiment of the present invention will be described below with reference to a flow chart illustrated in FIG. 6. In this embodiment, a multiplex transmission apparatus includes two multiplex transmission lines and two control units. For the sake of convenience in explanation, the same reference numerals as in the drawings related to the first embodiment described above denote parts having the same functions and a detailed description thereof will be omitted.

In the multiplex transmission apparatus of this embodiment, a CPU 15 of each of gateway nodes 5 and 6 shown in FIG. 2 reads out an ID code from the frame of a signal. In this case, each CPU 15 receives only signals with ID codes preset by a receiving processing program and transmits them from one network to the other. That is, a gateway node for performing the receiving processing is determined in accordance with the ID code of a signal, so signals with ID codes to be processed by the gateway node 5 are not processed by the gateway node 6. On the other hand, signals with ID codes to be processed by the gateway node 6 are not processed by the gateway node 5. The other arrangement is the same as that of the multiplex transmission apparatus of the first embodiment described above.

The receiving processing performed by the CPUs 15 of the gateway nodes 5 and 6 with the above arrangement will be described below by taking the gateway node 5 as an example.

Figure 6:
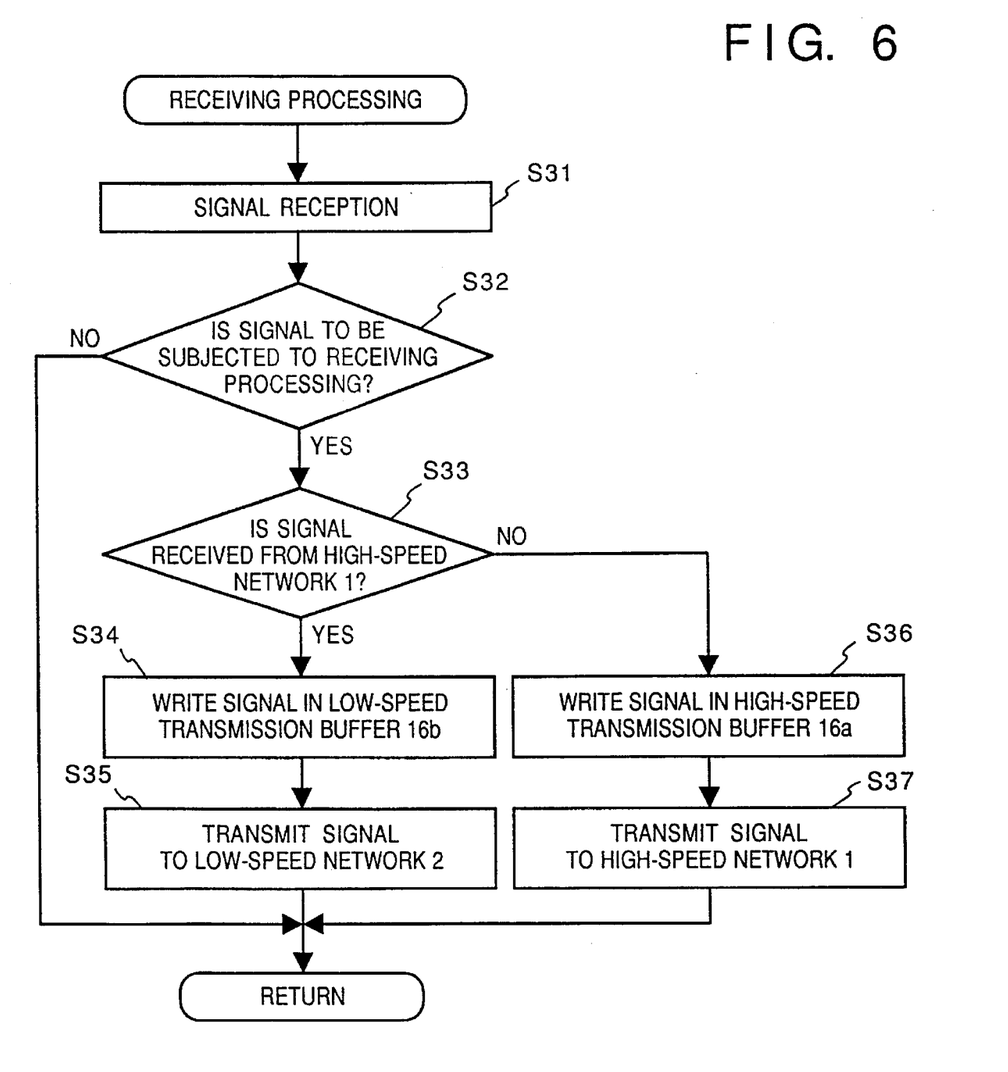
FIG. 6 is a flow chart which illustrates the receiving processing performed by gateway nodes of a multiplex transmission apparatus according to a third embodiment of the present invention.

As shown in FIG. 6, when a reception buffer 17a or 17b of the gateway node 5 receives a signal from a high-speed or low-speed network 1 or 2, the CPU 15 detects the reception of that signal by information from a determining unit 18a or 18b (step S31). The CPU 15 then reads out an ID code from the frame of that signal, checking whether the signal has an ID code preset by the receiving processing program (step S32).

If the signal does not have any ID code preset by the receiving processing program, the CPU 15 returns the flow without performing the receiving processing. If, on the other hand, the received signal has the ID code preset by the receiving processing program, the CPU 15 checks whether the signal is received from the high-speed network 1 (step S33). If the CPU 15 determines that the signal is received from the high-speed network 1, the CPU 15 writes the signal in a transmission buffer 16b of a low-speed communication LSI 14 (step S34), causing the low-speed communication LSI 14 to transmit the signal to the low-speed network 2 (step S35), and returning the flow.

If the CPU 15 determines in step S33 that the signal is not received from the high-speed network 1, i.e., that the signal is received from the low-speed network 2, the CPU 15 writes the signal in a transmission buffer 16a of a high-speed communication LSI 13 (step S36). The CPU 15 then causes the high-speed communication LSI 13 to transmit the signal to the high-speed network 1 (step S37) and returns the flow.

The same receiving processing is performed by the gateway node 6. That is, the receiving processing is performed when the CPU 15 determines in step S32 that the signal has the ID code preset by the receiving processing program. Signals with ID codes to be processed by the gateway node 5 are not processed by the gateway node 6, and those with ID codes not to be processed by the gateway node 5 are processed by the gateway node 6.

As described above, in the multiplex transmission apparatus of this embodiment, the CPUs 15 of the gateway nodes 5 and 6 control the gateway nodes 5 and 6 to transmit only their respective predetermined signals from one network to the other. This prevents a repetitive transmission of identical signals from the high-speed network 1 to the low-speed network 2 or vice versa, making it possible to increase the reliability of the multiplex transmission apparatus.

In addition, in the multiplex transmission apparatus of this embodiment, since the gateway nodes 5 and 6 are controlled to transmit only their respective predetermined signals, the gateway nodes 5 and 6 can be operated simultaneously. This makes efficient transmission of signals possible even when signals to be transmitted between the high-speed and low-speed networks 1 and 2 are increased in number. Accordingly, the signals can be processed without causing for example.

A fourth embodiment of the present invention will be described below with reference to flow charts illustrated in FIGS. 7 and 8. In this embodiment, a multiplex transmission apparatus includes two multiplex transmission lines and two control units. For the sake of convenience in explanation, the same reference numerals as in the drawings related to the first embodiment described above denote parts having the same functions and a detailed description thereof will be omitted.

In the multiplex transmission apparatus of this embodiment, a gateway node 5 shown in FIG. 2 transmits signals from a high-speed network 1 to a low-speed network 2, while a gateway node 6 transmits signals from the low-speed network 2 to the high-speed network 1. This other arrangement is the same as that of the multiplex transmission apparatus of the first embodiment described above.

The receiving processing performed by CPUs 15 of the gateway nodes 5 and 6 with the above arrangement will be described below.

Figure 7:
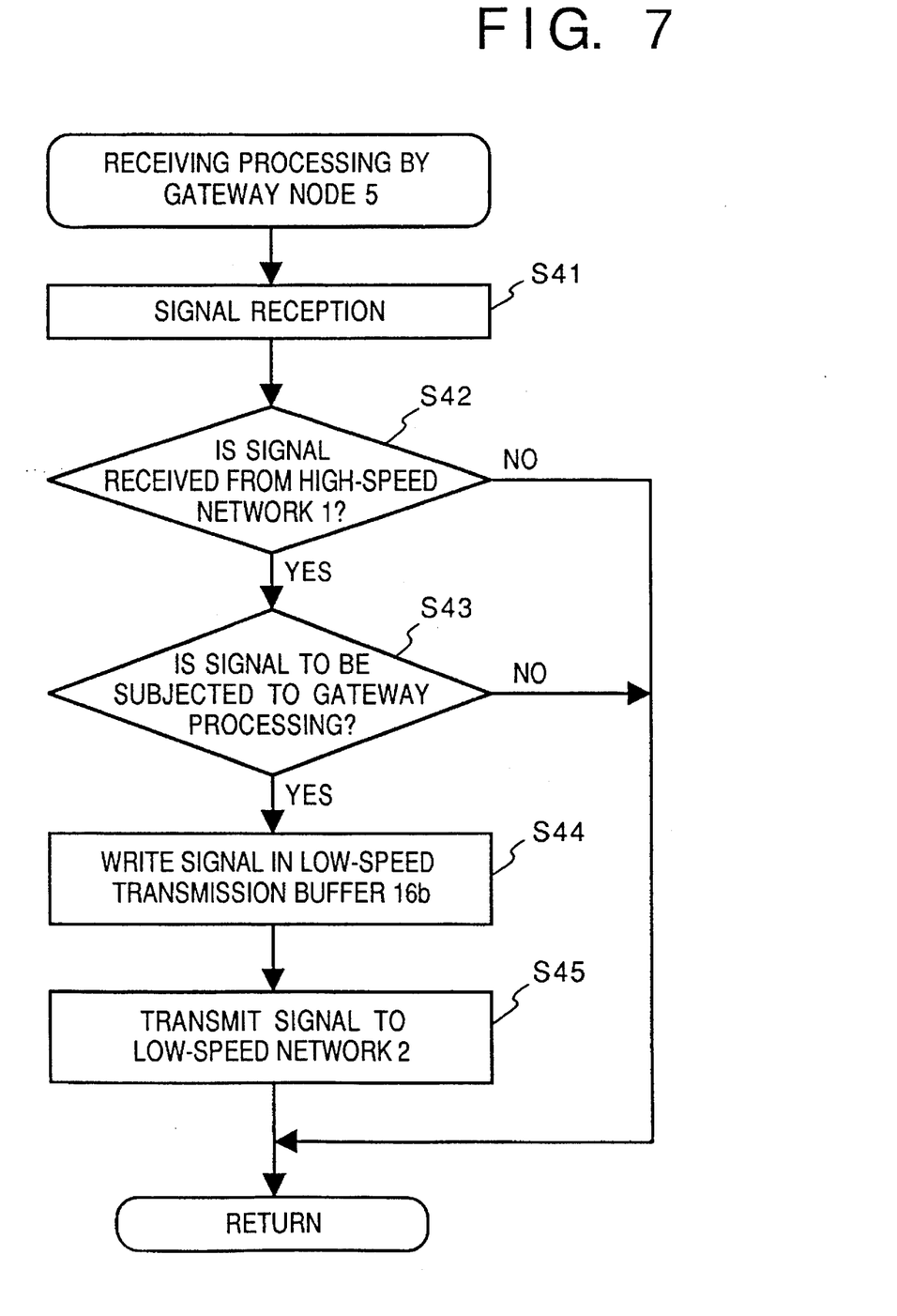
FIGS. 7 and 8 are flow charts which illustrate the receiving processing performed by gateway nodes of a multiplex transmission apparatus according to fourth embodiment of the present invention.

As shown in FIG. 7, when a reception buffer 17a or 17b of the gateway node 5 receives a signal from the high-speed or low-speed network 1 or 2, the CPU 15 detects the reception of that signal by information from a determining unit 18a or 18b (step S41) and checks whether the signal is received from the high-speed network 1 (step S42). If the CPU 15 determines that the signal is received from the high-speed network 1, the CPU 15 reads out an ID code from the frame of the signal, checking to which factor of traveling of a vehicle the signal relates. For example, the CPU 15 checks in accordance with the importance of that signal with respect to the reliability and the safety of a vehicle whether the signal is to be subjected to gateway processing (step S43).

If the CPU 15 determines that the signal is to be subjected to gateway processing from the high-speed network 1 to the low-speed network 2, the CPU 15 writes the signal in a transmission buffer 16b of a low-speed communication LSI 14 (step S44), causing the low-speed communication LSI 14 to transmit the signal to the low-speed network 2 (step S45), and returning the flow. On the other hand, if the CPU 15 determines in step S42 that the signal is not received from the high-speed network 1 and in step S43 that the signal is not to be subjected to the gateway processing from the high-speed network 1 to the low-speed network 2, the CPU 15 returns the flow without performing the receiving processing for that signal.

Figure 8:
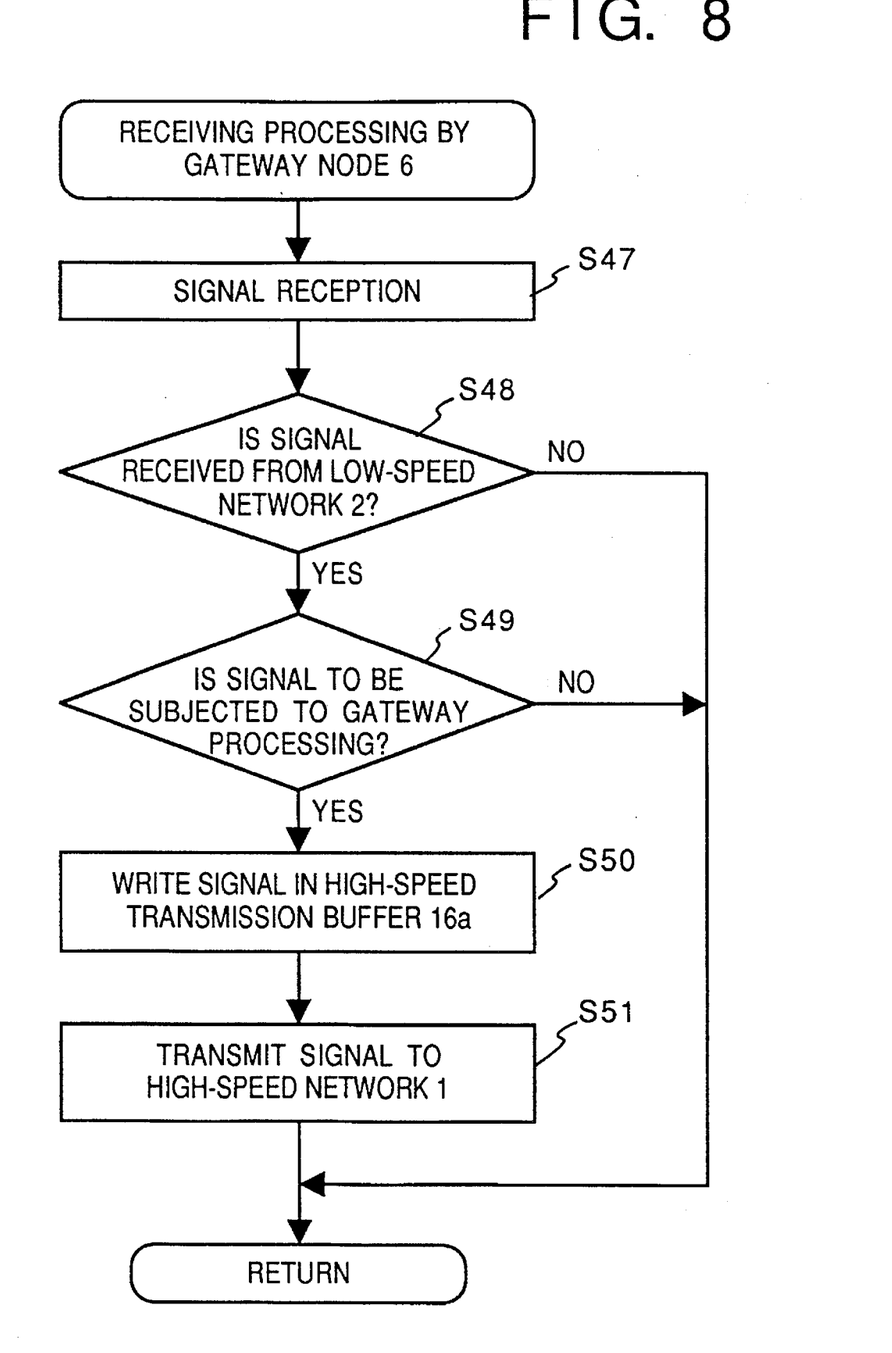

On the other hand, as shown in FIG. 8 when a reception buffer 17a or 17b of the gateway node 6 receives a signal from the high- or low-speed network 1 or 2, the CPU 15 detects the reception of that signal by information from a determining unit 18a or 18b (step S47) and checks whether the signal is received from the low-speed network 2 (step S48). If the CPU 15 determines that the signal is received from the low-speed network 2, the CPU 15 reads out an ID code from the frame of the signal, checking to which factor of traveling of a vehicle the signal relates. For example, the CPU 15 checks in accordance with the importance of that signal with respect to the reliability and the safety of a vehicle whether the signal is to be subjected to gateway processing (step S49).

If the CPU 15 determines that the signal is to be subjected to gateway processing from the low-speed network 2 to the high-speed network 1, the CPU 15 writes the signal in a transmission buffer 16a of a high-speed communication LSI 13 (step S50). The CPU 15 then causes the high-speed communication LSI 13 to transmit the signal to the high-speed network 1 (step S51) and returns the flow. On the other hand, if the CPU 15 determines in step S48 that the signal is not received from the low-speed network 2 and in step S49 that the signal is not to be subjected to the gateway processing from the low-speed network 2 to the high-speed network 1, the CPU 15 returns the flow without performing the receiving processing for that signal.

As described above, in the multiplex transmission apparatus of this embodiment, the gateway node 5 transmits signals from the high-speed network 1 to the low-speed network 2, whereas the gateway node 6 transmits signals from the low-speed network 2 to the high-speed network 1. Therefore, transmission of signals from the high-speed network 1 to the low-speed network 2 is performed by the gateway node 5 alone, and transmission of signals from the low-speed network 2 to the high-speed network 1 is performed by the gateway node 6 alone. Since this prevents a repetitive transmission of identical signals, the reliability of the multiplex transmission apparatus can be increased.

In addition, in the multiplex transmission apparatus of this embodiment, the gateway node 5 transmits signals from the high-speed network 1 to the low-speed network 2, and the gateway node 6 transmits signals from the low-speed network 2 to the high-speed network 1, so the gateway nodes 5 and 6 can be operated at the same time. This makes efficient transmission of signals possible even when the number of signals to be transmitted between the high-speed and low-speed networks 1 and 2 increases, so the signals can be processed without causing overflow, for example.

Furthermore, in the above embodiment, the gateway node 5 transmits signals from the high-speed network 1 to the low-speed network 2, while the gateway node 6 transmits signals from the low-speed network 2 to the high-speed network 1. It is, however, of course possible to obtain the same effect when the gateway node 5 transmits signals from the low-speed network 2 to the high-speed network 1 and the gateway node 6 transmits signals from the high-speed network 1 to the low-speed network 2.

Moreover, the multiplex transmission apparatus of each of the above embodiments includes two multiplex transmission lines and two control units, but the numbers of multiplex transmission lines and control units are not limited to those in the above-described embodiments. As an example, the multiplex transmission apparatus of the present invention may include three or more multiplex transmission lines and three or more control units. If three or more control units are provided in particularly the fourth embodiment described above, the priority order as in the first embodiment need only be set for these control units.

As many apparently widely different embodiments of the present invention can be made without departing from the spirit and scope thereof, it is to be understood that the invention is not limited to the specific embodiments thereof except as defined in the appended claims and their equivalents.

What is claimed is:

1. A multiplex transmission apparatus having a plurality of control units connected independently of one another over a plurality of multiplex transmission lines, each of said plurality of control units having a central processing unit to perform transmission and reception of signals over said plurality of multiplex transmission lines via an internal memory of each of said control units, and said memory temporarily stores said signals, the apparatus comprising;

means for judging, in the central processing unit, which transmission line among said plurality of multiplex transmission lines is a source of a received signal;

means for determining, in the central processing unit, whether a signal to be transmitted to a first transmission line which is one of said plurality of multiplex transmission lines remains non-volatilized in said memory;

means for judging, in the central processing unit, whether the received signal is identical with the signal to be transmitted to the first transmission line, if it is determined that the received signal is from the first transmission line and if it is determined that the signal to be transmitted to the first transmission line remains in said memory; and means for inhibiting, in the central processing unit, transmission of the signal which is to be transmitted to the first transmission line, if it is judged that the received signal is identical with the signal to be transmitted to the first transmission line.

2. The apparatus according to claim 1, further comprising means for determining, in the central processing unit, a degree of importance of the received signal indicated by a specific code contained in the signal, wherein if the signal to be transmitted to the first transmission line does not remain in said memory or if the importance of the received signal is higher than that of the signal to be transmitted to the first transmission line, the received signal is transmitted to a second transmission line among said plurality of multiplex transmission lines.

3. The apparatus according to claim 2, wherein said first transmission line transmits signals at a high speed and said second transmission line transmits signals at a low speed.

4. The apparatus according to claim 1, wherein said apparatus is disposed in a motor vehicle.

5. A multiplex transmission apparatus having a plurality of control units connected independently of one another over a plurality of multiplex transmission lines, each of said plurality of control units having a central processing unit to perform transmission and reception of signals over said plurality of multiplex transmission lines in accordance with internal control programs of said control units, and each of said signals has a specific code, the apparatus comprising:

means for classifying, in the central processing unit, said signals into groups based on said specific code;

means for allocating, in the central processing unit, each group of said groups to each control unit of said plurality of control units;

means for identifying, in the central processing unit, a transmission source of a received signal from among said plurality of multiplex transmission lines; and means for transmitting, in the central processing unit, the received signal to a predetermined transmission line in accordance with the identification result obtained by said means for identifying, wherein each of said plurality of control units performs said transmission and reception of signals of the group which is allocated by said means for allocating, and said means for allocating executes the allocation so as to avoid repetitive transmission of signals by each of said plurality of control units.

6. The apparatus according to claim 5, wherein said plurality of multiplex transmission lines includes a first transmission line for transmitting signals at a high speed and a second transmission line for transmitting signals at a low speed, and in each of said plurality of control units having the central processing unit, said means for transmitting the received signal transmits the received signal to said second transmission line if it is identified that said first transmission line is the transmission source of the received signal, and transmits the received signal to said first transmission line if it is identified that said second transmission line is the transmission source of the received signal.

7. The apparatus according to claim 5, wherein said apparatus is disposed in a motor vehicle.

* * * * *

UNITED STATES PATENT AND TRADEMARK OFFICE
CERTIFICATE OF CORRECTION

PATENT NO. : 5,588,002
DATED : December 24, 1996
INVENTOR(S) : Toshiaki Kawanishi et al.

It is certified that error appears in the above-indentified patent and that said Letters Patent is hereby corrected as shown below:

Col. 1, line 28, change "Publication" to --Publication,--;

line 32, change second and third occurrence of "system" to --systems--;

line 33, change "system" to --systems--;

line 43, change "case," to --cases,--.

UNITED STATES PATENT AND TRADEMARK OFFICE
CERTIFICATE OF CORRECTION

PATENT NO. : 5,588,002
DATED : December 24, 1996
INVENTOR(S) : Toshiaki Kawanishi et al It is certified that error appears in the above-indentified patent and that said Letters Patent is hereby corrected as shown below:

Col. 2,     line 41, change "illustrates" to --illustrate--;

line 44, change "for explaining" to --which illustrates--.

Col. 8,     line 23, change "the-multiplex" to --the multiplex--;

line 31, after "causing", insert --overflow--.

Col. 9,     line 12, change "FIG. 8" to --FIG. 8,--.

Signed and Sealed this

Seventeenth Day of June, 1997

Attest:

BRUCE LEHMAN

*Attesting Officer*      Commissioner of Patents and Trademarks